United States Patent [19]

Stout

[11] Patent Number: 5,007,699
[45] Date of Patent: Apr. 16, 1991

[54] FIBER OPTIC REFLECTIVE TREE ARCHITECTURE

[75] Inventor: James C. Stout, Phoenix, Ariz.

[73] Assignee: Honeywell Inc., Minneapolis, Minn.

[21] Appl. No.: 423,901

[22] Filed: Oct. 19, 1989

[51] Int. Cl.$^5$ ............................ G02B 6/28; G02F 1/00
[52] U.S. Cl. .................................... 350/96.16; 455/610
[58] Field of Search .......................... 350/96.15–96.16; 455/607, 610, 612

[56] References Cited

U.S. PATENT DOCUMENTS

| | | | |
|---|---|---|---|
| 4,457,581 | 7/1984 | Johnson et al. | 350/96.16 |
| 4,528,695 | 7/1985 | Khoe | 350/96.15 X |
| 4,573,215 | 2/1986 | Oates et al. | 350/96.15 X |
| 4,590,619 | 5/1986 | Winzer | 455/607 X |
| 4,775,210 | 10/1988 | Fioretti | 350/96.16 |
| 4,826,275 | 5/1989 | Heinzman | 350/96.16 |

OTHER PUBLICATIONS

Optical/Optoelectronic Engr. updated Series; "Optical Fiberoptic Systems for Aircraft", by Morris Lewis, pp. 32–68, 3/87.
"Digital System BM Integrity", by Eldredge and Hill, pp. 37–56, Mar. 1987.
"Toward Fly-by-Light Aircraft", by Todd et al., SPIE, vol. 989, Fiber Optic Systems for Mobile Platforms.

*Primary Examiner*—Akm Ullah
*Attorney, Agent, or Firm*—A. A. Sapelli; D. J. Lenkszus; A. Medved

[57] ABSTRACT

The fiber optic network of the present invention is within a structure having a plurality of bulkheads. The network comprises a plurality of terminal groups, each terminal group having at least one terminal. The network includes a reflective star coupler having m ports, m corresponding to the number of terminal groups. The terminal groups (having more than one terminal) include a 1×n transmissive coupler having 1 input port and n output ports, the input port being connected to the reflective star coupler via one of the m fiber optic cables, such that each bulkhead has a single fiber optic cable passing through the bulkhead.

3 Claims, 6 Drawing Sheets

FIBER OPTIC REFLECTIVE TREE ARCHITECTURE

RELATED PATENT APPLICATION

The present patent application is related to U.S. patent application, Ser. No. 423,906, entitled "DATA FEEDBACK IN A FIBER OPTIC BUS" by J. C. Stout, filed on even date herewith, and assigned to Honeywell Inc., the assignee of the present application.

BACKGROUND OF THE INVENTION

This invention relates to data transmission networks, and more particularly, to a fiber optic local area network partitioned by bulkheads.

Linear bus and reflective star architectures have been employed in autonomous fiber optic networks. (In an autonomous data bus the bus architecture is such that all terminals of the bus can hear the transmission of any other terminal, regardless of whether or not data transfer is necessary between all terminals. Thus, each terminal can independently determine the bus idle state.) The linear bus utilizes two bus fibers, one for each direction of information flow. A linear bus also can be built with a single bidirectional bus fiber at the expense of an additional power loss. The star architecture is implemented with a reflective star coupler at the heart of the network.

With the two-fiber linear bus a separate light emitter diode (LED) is used to transmit in each direction on the bus through 2×2 directional optical couplers. A top (or uppermost) terminal receives optical data transmitted from a center terminal through an upward flow (ie., from the terminal to the controller) bus fiber. A lower terminal receives optical data transmitted from the center terminal through a downward flow (ie., from the controller to the terminals) bus fiber. In this way all terminals on the bus hear the transmission of all other terminals.

The reflective star bus architecture, has optical power signals launched onto the bus through 1×2 directional couplers. A signal input at any port of the star coupler is reflected to all ports as output from the coupler. Signals are then routed to each terminal on the bus. The 1×2 couplers at the terminals provide the capability to launch onto and tap off of the optical bus.

The linear bus requires twice as many LED sources and about fifty percent more connectors to implement and also has a somewhat higher power budget requirement than the architecture of the present invention.

The reflective star architecture requires much more fiber than the preferred embodiment of the present invention, and oftentimes requires many more connectors than the architecture of the present invention when terminals are separated by bulkhead surfaces. Therefore, a bus architecture is desired which provides the capabilities for autonomous bus operation while maintaining power budget and component efficiency.

The preferred embodiment of the present invention utilizes a transmissive star coupler at each of the remotely located terminal groups to funnel signals onto a single fiber for a data transfer, over some relatively large distance, to a centralized reflective star coupler. Increased fiber efficiency, as well as a reduction in the number of bulkhead connectors that is required in some applications, is realized in the present invention because only a single fiber is required to carry optical power signals to each remotely located group of terminals. Also, a space and weight savings is realized with the architecture of the present invention because of the reduced fiber and connector demands.

The present invention applies to the field of fiber optic local area networks and is particularly applicable in networks which are partitioned by bulkheads (bulkheads can be walls, partitions, . . . to separate compartments). The invention finds particular application as a data bus architecture for a commercial aircraft primary flight controls system, where the relative location of terminals are generally partitioned by bulkheads.

The fiber optic network of the present invention can be utilized to link terminals in a network, independent of whether or not the network is autonomous or utilizes a centralized bus control protocol. The architecture of the present invention is particularly useful in networks where two or more similar size groups of terminals are separated by bulkheads or a large distance. The present invention provides an advantage in fiber and connector requirements over star network and also yields weight and space savings. The invention finds particular application in "fly-by-light" aircraft.

SUMMARY OF THE INVENTION

Therefore, there is provided by the present invention, a power budget and component efficient, optical fiber bus network for autonomous bus operation wherein terminals connected to the bus are separated by bulkheads. The fiber optic network of the present invention is within a structure having a plurality of bulkheads. The network comprises a plurality of terminal groups, each terminal group having at least one terminal. The network includes a reflective star coupler having m ports, m corresponding to the number of terminal groups. The terminal groups (having more than one terminal) include a 1×n transmissive coupler having 1 input port and n output ports, the input port being connected to the reflective star coupler via one of the m fiber optic cables, such that each bulkhead has a single fiber optic cable passing through the bulkhead. (The terms input port and output port are used in conjunction with optical couplers herein to differentiate between a first set of ports and a second set of ports since it is well recognized by those skilled in the optical arts that "input ports" can also act as the "output ports" during a different time period or operating cycle.)

Accordingly, it is an object of the present invention to provide an optical fiber bus network.

It is another object of the present invention to provide an optical fiber bus network for autonomous or non-autonomous operation.

It is still another object of the present invention to provide an optical fiber bus network wherein the predetermined power budget and component efficiency are maintained.

These and other objects of the present invention will become more apparent when taken in conjunction with the following description and attached drawings, wherein like characters indicate like parts, and which drawings form a part of the present application.

DETAILED DESCRIPTION

Figure 1:
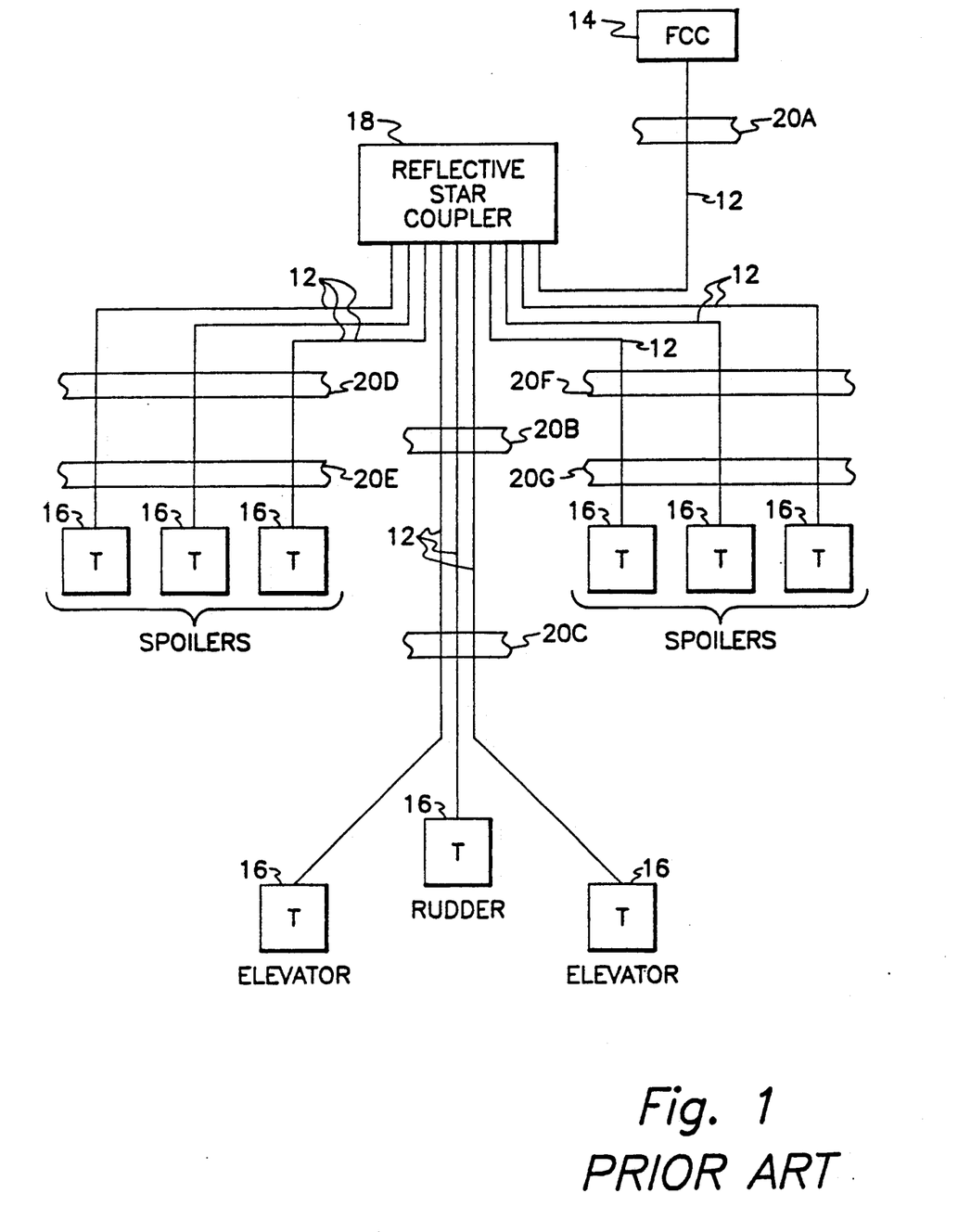
FIG. 1 shows a network of the prior art using a star-type architecture.

Referring to FIG. 1, there is shown a network of the prior art using a star-type architecture. A flight control computer (FCC) 14 is coupled to a variety of terminals (T) 16, via a reflective star coupler 18, which includes the primary flight surfaces (spoilers, elevators, and rudder). Also shown are the bulkheads 20 A through 20 G. In most instances, this architecture requires a plurality of fiber optic cables 12 to pass through most bulkheads 20 in order to connect the FCC 14 terminal to the smart actuator terminals 16.

Figure 2:
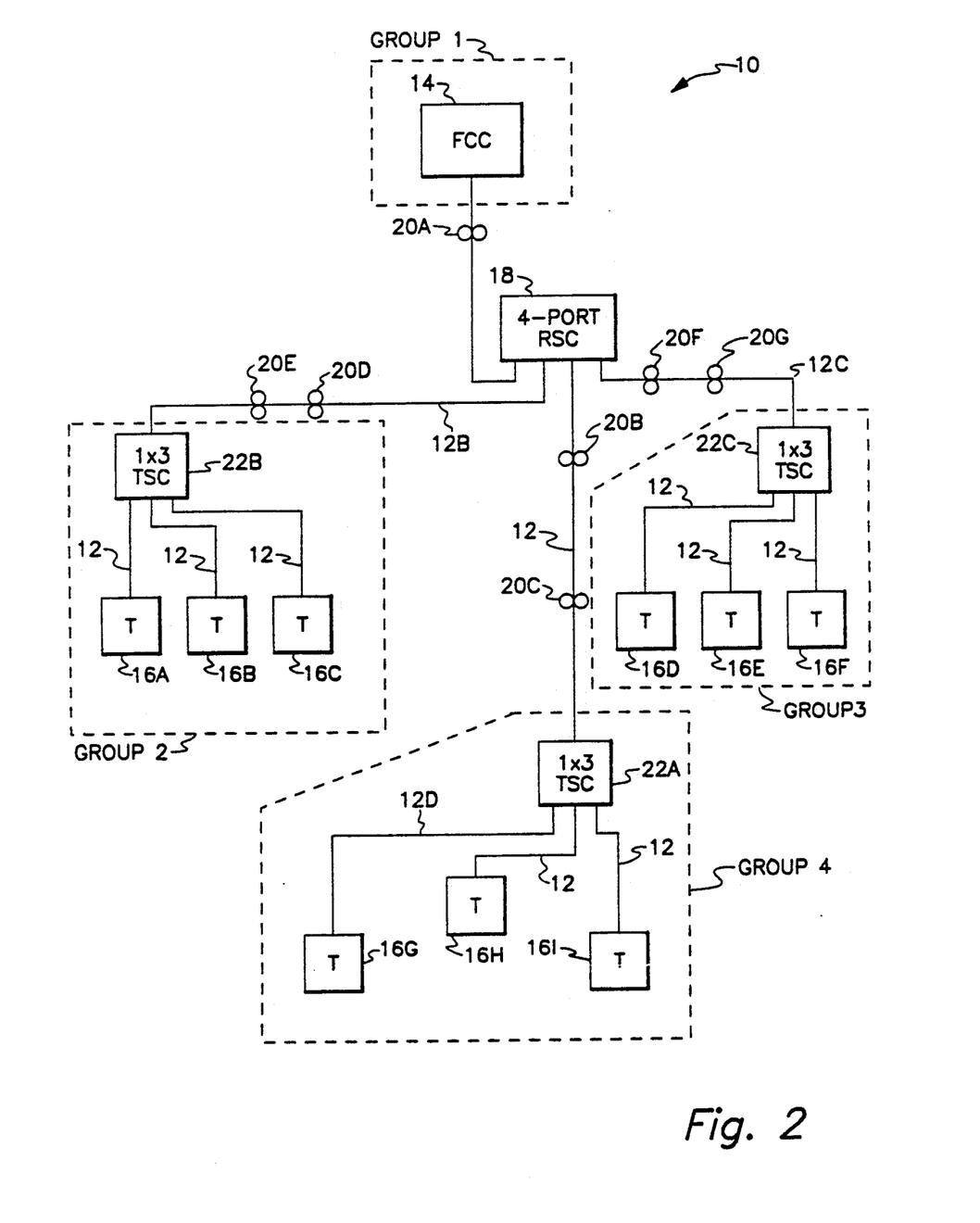
FIG. 2 shows a block diagram of the fiber optic network of the preferred embodiment of the present invention.

Referring to FIG. 2, there is shown a block diagram of a fiber optic network of the preferred embodiment of the present invention. The architecture of a fiber optic network 10 of the preferred embodiment of the present invention links ten (10) terminals together on a fiber optic bus 12, or more simply referred to herein as the bus 12. The architecture of the network 10 (referred to as a reflective tree architecture) links a FCC 14 to a variety of slave terminals (T) 16. In the preferred embodiment of the present invention, the terminals 16 are smart actuators, and include actuators for the right and left elevators, right and left spoilers, and lower rudder. The controller 14 is a flight control computer (FCC). Although the preferred embodiment shows only ten terminals (one controller 14 and nine smart actuators 16) linked on the network, it will be recognized by those skilled in the art that the numbers of terminals linked on the network can vary while maintaining the reflective tree architecture configuration. It will also be recognized by those skilled in the art that the network supports both autonomous and non-autonomous communications. The preferred embodiment of the present invention employes the autonomous ARINC 629 protocol, which is a newly developed protocol and is being considered by the Federal Aviation Administration (FAA) as standard for moderate bandwidth commercial avionic data bus communications. It will be recognized by those skilled in the art that many existing and/or newly developed protocols may be utilized and supported by the architecture of the present invention.

The fiber optic bus 12 connects the FCC 14 to a 4-port RSC (reflective star coupler) 18 through a bulkhead 20A. (Although not shown, the fiber optic bus 12 can be inserted through an opening in the bulkhead 20 or through an optical connector on the bulkhead.) Similarly, the fiber optic bus 12 couples signal from the 4-Port RSC 18 through two additional bulkheads 20B, 20C to a 1×3 TSC (Transmissive Star Coupler) 22A. The 1×3 TSC 22A connects terminals (T) 16 G, H, I to the network 10. The 4-port RSC 18 also connects to a 1×3 TSC 22B, and a 1×3 TSC 22C via fiber optic bus 12 B, C, respectively, through bulkheads 20 D, E, and 20 F, G, respectively. The 1×3 TSC 22B connects terminals 16 A, B, C, and the 1×3 TSC 22C connects terminals 16 D, E, F to the network 10. (Terminals 16 A, B, C, terminals 16 D, E, F, and terminals 16 G, H, I are each referred to as a group of three, and FCC 14 is referred to as a group of one.)

The preferred embodiment of the present invention links ten (10) terminals together on the fiber optic data bus 12. The architecture of the preferred embodiment of the present invention can be modified to accommodate more more or fewer terminals by altering the quantity of terminals of each group or by modifying the number of groups. If the number of terminals in a group is modified, the number of ports in the associated transmissive coupler is modified accordingly. If the number of groups is modified, the number of ports in the reflective star coupler is adjusted accordingly. The reflective tree architecture of the present invention is most efficiently implemented when the terminals of a network can be grouped by proximity into several similar size clusters (or groups). A network composed of similar size terminal groups provides similar optic power losses between any two terminals.

It is evident from the above, that at most one cable (fiber optic bus 12) needs to be coupled through the bulkhead.

The architecture of the present invention permits any terminal 14, 16 on the bus 12 to communicate with any other. For example, if terminal 16G transmits a signal onto the bus, the optical data is guided along the bus fiber 12D to 1×3 TSC 22A. The optical power is guided only upwards (i.e., toward the FCC 14) through this coupler 22A and delivered to the 4-Port RSC 18, which outputs the signal to all ports, including the input port. Thus, the optical signal is guided (or coupled) to the 1×3 TSC 22A, the 1×3 TSC 22B, the 1×3 TSC 22C, and the FCC 14. At the transmissive star couplers 22 A, B, C, the signal is transmitted through to each terminal associated with the respective coupler 22 A, B, C.

Figure 3:
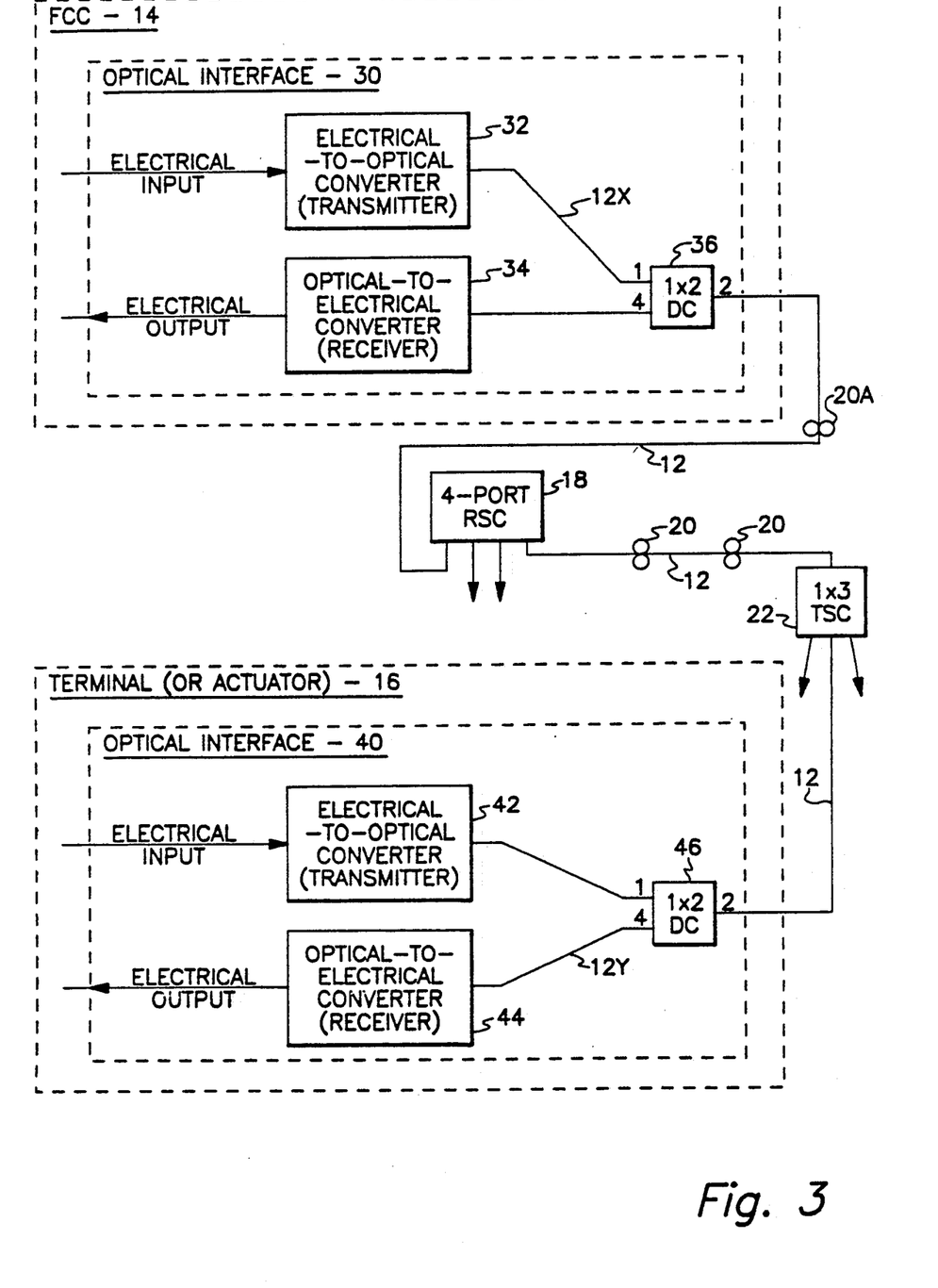
FIG. 3 shows a block diagram of a complete optical data path of the network of the preferred embodiment of the present invention.

Referring to FIG. 3, there is shown a block diagram of a complete optical data path of the network 10 of the preferred embodiment of the present invention. An optical interface 30 of the FCC 14 includes an electrical-to-optical converter (or transmitter) 32, and an optical-to-electrical converter (or receiver) 34. The transmitter 32 receives an electrical input signal from logic (not shown) of the FCC 14, and the receiver 34 converts optical signals to electrical output signals which are coupled to logic (not shown) of FCC 14. A 1×2 DC (Directional Coupler) 36 couples optical signals received from the transmitter 32 onto the fiber optic bus 12, and couples optical signals received on the bus 12 to the receiver 34. Likewise, the terminal 16 includes an optical interface 40 which includes a transmitter 42, a receiver 44, and a 1×2 DC 46, for interfacing the terminal (or actuator) 16 to the bus 12. The logic (not shown) of the FCC 14 and the terminal 16 will not be described further since it is not necessary to an understanding of the present invention.

A transmission of information from FCC 14 to the terminal 16 will now be described. The transmitter 32 of the FCC 14 launches an optical signal (or optical power) onto the fiber 12X, which is coupled to port 1 of 1×2 DC 36. Fifty percent (50%) of the optical power input to the 1×2 DC 36 is lost due to splitting, the remaining fifty percent (50%) (less some loss in the coupler 36) is outputted to port 2 of the 1×2 DC 36. (The port numbers are indicated around the periphery of the block.) The optical signal is then conducted to the 4-Port RSC 18 via the bus 12. Power inputted to the 4-Port RSC 18 is outputted to all ports of the coupler 18 at twenty five percent (25%) of the input power level (minus some small losses of the coupler 18). The signal is then coupled to port 2 of the 1×2 DC 46 of the optical interface 40 of the terminal 16 via bus 12 and 1×3 TSC 22. Fifty percent (50%) of the power inputted at the port 2 of coupler 46 (less some losses of the coupler 46) is outputted at port 4 of the 1×2 DC 46 and coupled via fiber 12Y to the receiver 44 of terminal 16. In a like manner all the terminals 16 of the network 10 receive the optical signal.

The terminal 16 transmits to the FCC 14 along the path as follows: from transmitter 42 of optical interface 40, to 1×2 DC 46, to 1×3 TSC 22, to 4-Port RSC 18, to 1×2 DC 36 of optical interface 30 of FCC 14, to receiver 34. Identical losses are incurred in the signal, in the transmission from the controller 14 to the terminal 16, as in the transmission from the terminal 16 to the FCC 14.

The reflective star coupler is a passive device which couples light that is input at any given port to all ports as output. For example, optic power which is input at port m, where m is any given port of the device, is output to all ports including port m.

If $P_{in}$ is the optic power input at port m, the optic power output to port n, where n is any port of the coupler, is given by:

$$P_{out} = P_{in}/N - (Total\ Excess\ Loss\ Within\ Coupler)$$

where
N = number of ports.

Figure 4:
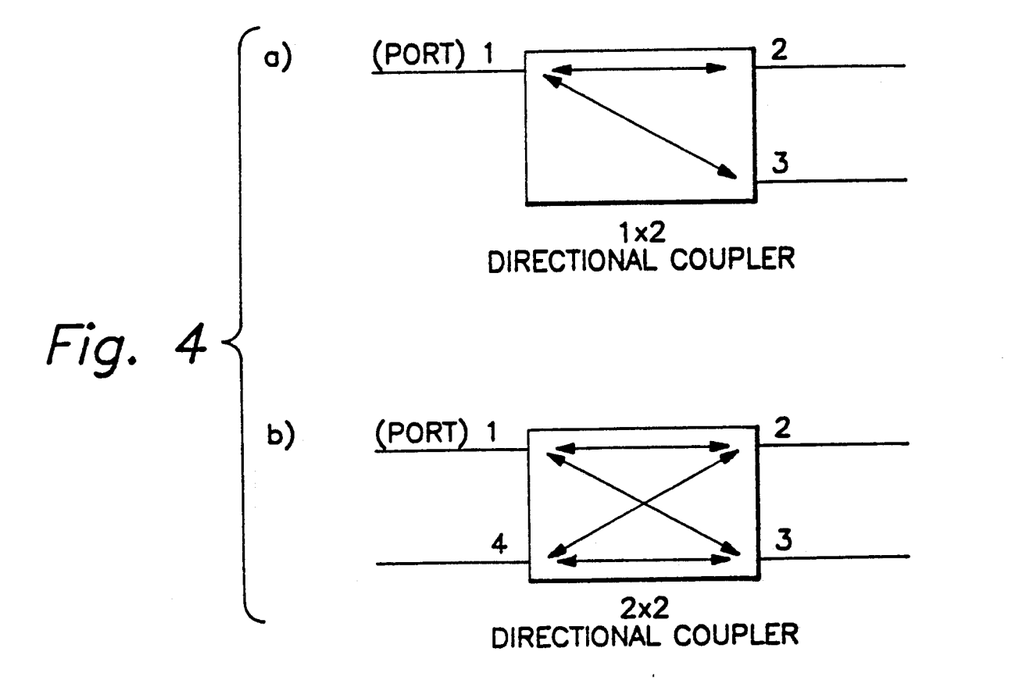
FIG. 4 shows functional block drawings of the directional couplers utilized in the preferred embodiment of the present invention.

Referring to FIG. 4, there is shown a functional block drawing of the directional couplers utilized in the preferred embodiment of the present invention, indicating transmission paths and directions of the transmissions between ports. Optic power input at port 1 of the 2×2 directional coupler is output to ports 2 and 3. The splitting ratio is the power output to port 2 divided by that which is output to port 3. When power is input at port 2, the same splitting ratio is observed at output ports 1 and 4 as exists between ports 2 and 3 with input at port 1. The port directly across from the input port is the favored port, receiving at least 50% of the input power. The other output port is the tap port. This observation demonstrates the symmetrical nature of the directional couplers. Couplers also demonstrate the property of reciprocity, ie., the loss between any two ports is independent of the direction of travel of the optic power signal. The loss from port 1 to port 3 is the same as the loss from port 3 to 1.

Figure 5:
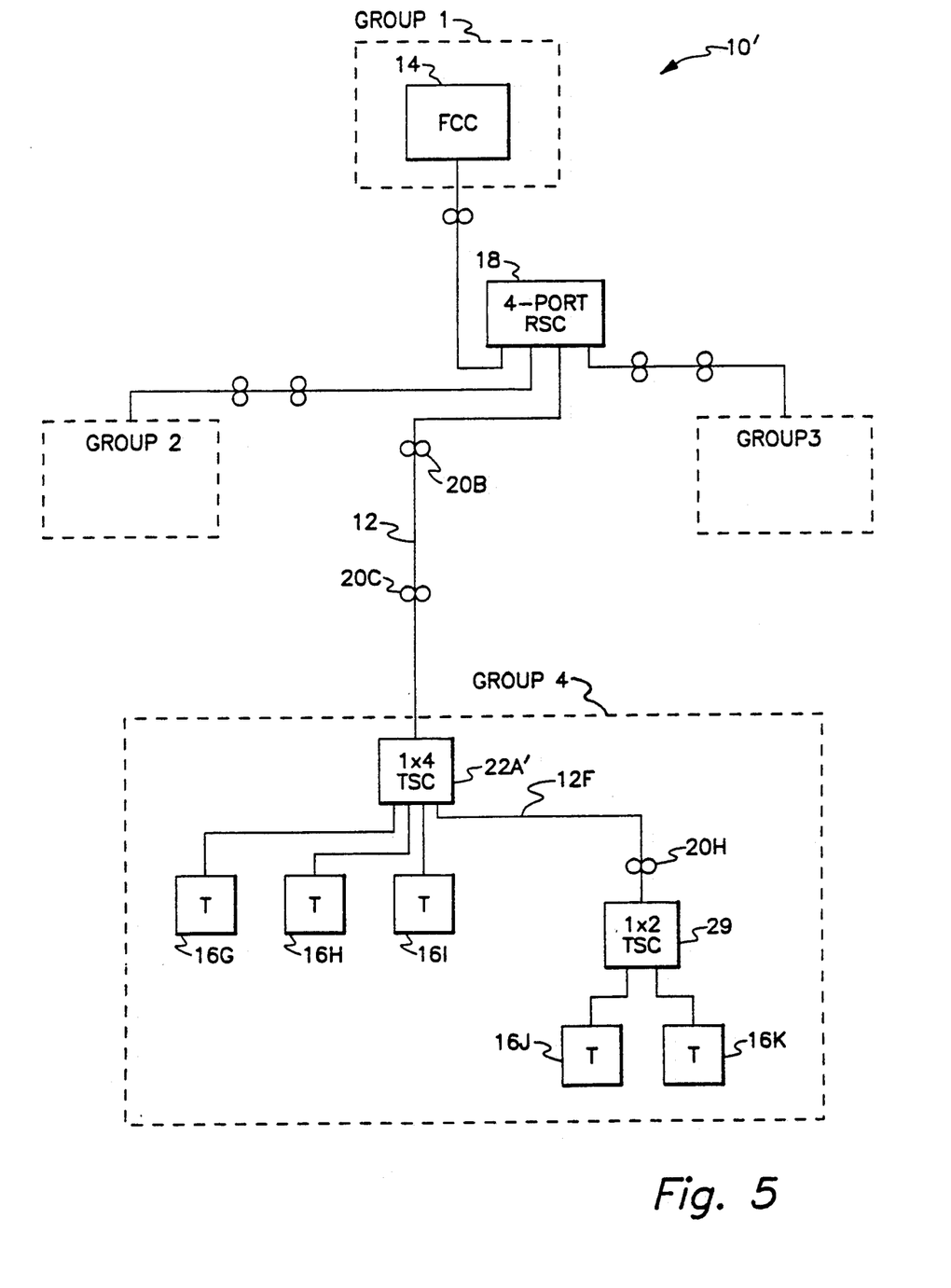
FIGS. 5 and 6 each show an alternative network configuration of the present invention.
Figure 6:
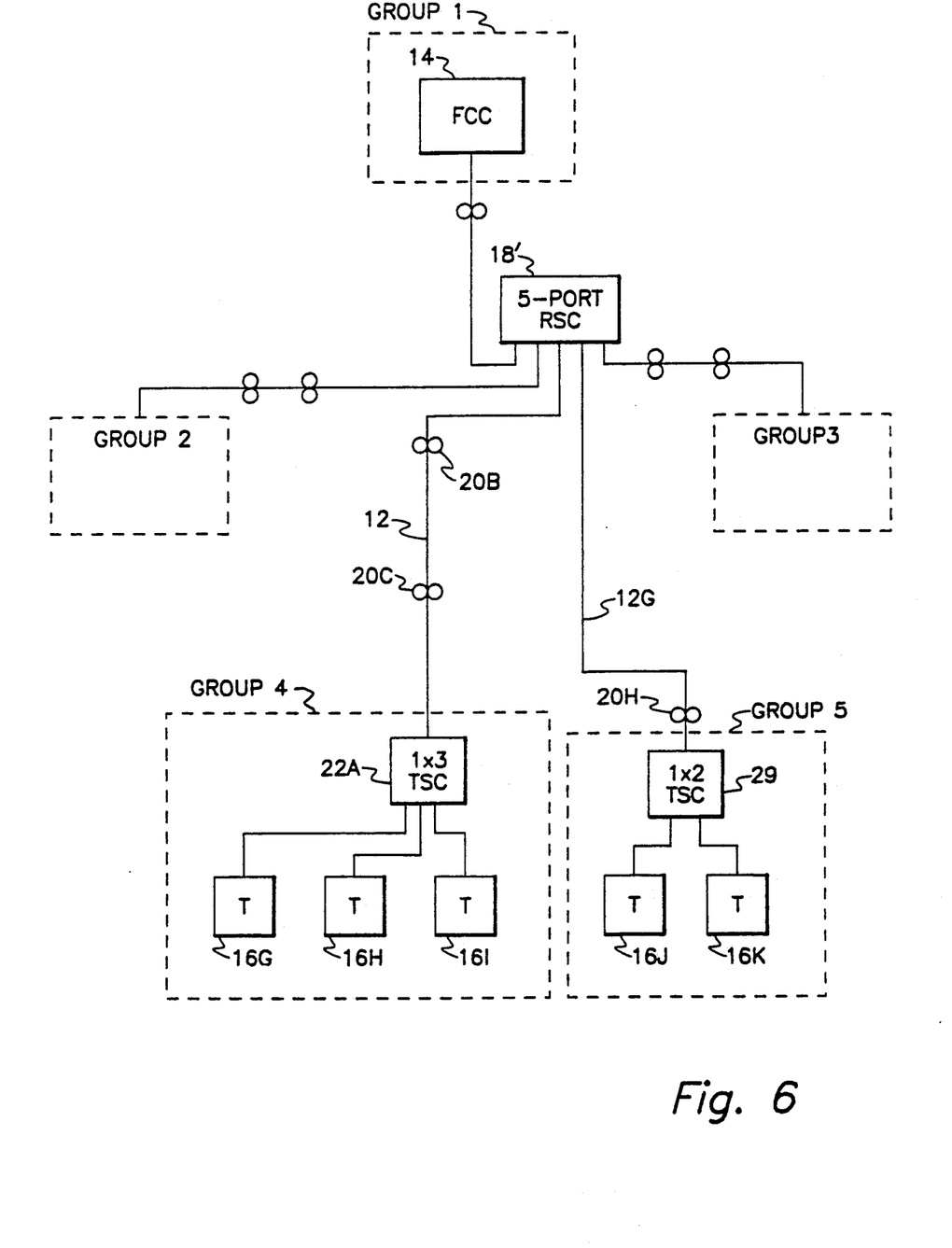

Referring to FIGS. 5 and 6, there are shown two alternative configurations of the present invention. Groups 1, 2, and 3 are the same as that of FIG. 2. In FIG. 5, there are additional terminals 16J and 16K. In order to link these terminals 16J, 16K to the network there is an additional bulkhead 20H which must be pierced. Thus, in order to keep a single fiber optic cable 12 to pass through each bulkhead, a 1×4 TSC 22A' is utilized to connect terminals 16 G, H, and I, and the fourth port of 1×4 TSC 22A' has a bus 12F connected to a 1×2 TSC 29 through the bulkhead 20H, and then to the terminals 16J, 16K. Thus the one cable pass through the bulkhead is maintained. In this particular case, it was necessary to go through bulkheads 20B, 20C, and 20H in order to have access to terminals 16J, 16K.

If access to terminals 16J and 16K only requires going through bulkhead 20H, the configuration of FIG. 6 is applicable. Group 4 then remains identical to that of FIG. 2, and new group 5 is defined. A 5-Port RSC 18' is utilized, the fifth port utilized to connect Group 5 terminals 16J, 16K to the network utilizing the 1×2 TSC 29 and fiber optic cable 12G.

While there has been shown what is considered the preferred embodiment of the present invention, it will be manifest that many change and modifications can be made therein without departing from the essential spirit and scope of the invention. It is intended, therefore, in the annexed claims to cover all such change and modifications which fall within the true scope of the invention.

I claim:

1. A fiber optic network contained within a structure, the structure being divided into a first plurality of compartments by a second plurality of bulkheads, said fiber optic network comprising:
    (a) a reflective star coupler, being located in a predetermined compartment of said structure, and having m ports;
    (b) a third plurality of terminals, each terminal being located in one of said compartments, each terminal capable of at least receiving optical signals containing information therein in accordance with a predefined protocol, the terminals being divided into a fourth plurality of terminal groups, each terminal group having a least one terminal, such that each terminal within the terminal group has at least one coupling through a common bulkhead to said reflective star coupler, the number of terminal groups being m corresponding to the number of ports of said reflective star coupler;
    (c) m fiber optic cables, each fiber optic cable operatively connected to a port of the reflective star coupler and to a predetermined terminal group, such that each bulkhead has at most one coupling of the fiber optic cable through said bulkhead; and
    (d) said each terminal terminal group having more than one terminal in the terminal group and contained in a single compartment, comprises:
        (i) a 1×n transmissive coupler, having an input port and n output ports; and
        (ii) a plurality of terminals, each terminal operatively connected to the transmissive coupler, and wherein the input port is operatively connected to the reflective star coupler via one of said m fiber optic cables, where m is equal to the number of terminals in the terminal group.

2. A fiber optic network according to claim 1, wherein each terminal group having more than one terminal in the terminal group and contained in a fifth plurality of compartments, comprises:
    (a) a plurality of 1×q transmissive couplers, having an input port and q output ports, each of said fifth plurality of compartments including one of said 1×q transmissive couplers; and
    (b) a plurality of terminal in each compartment, each terminal operatively coupled to the 1×q transmissive coupler contained with the compartment, and wherein the input port of the 1×q transmissive coupler closest to the reflective star coupler is operatively connected to the reflective star coupler via one of said m fiber optic cables, and the remaining output terminal of the 1×q transmissive coupler closest to the reflective star coupler is coupled to the input of the 1×q transmissive coupler in a next adjacent compartment, such that a single coupling is made through the bulkhead forming the compartments, and wherein each remaining 1×q transmissive coupler has its output terminal coupled to the input terminal of the 1×q transmissive coupler in the next adjacent compartment, where q is equal to the number of terminals within the compartment minus one for all compartments in the network path except the last compartment, where q is equal to the number of terminals in the last compartment.

3. A fiber optic network according to claim 2, wherein each terminal group having one terminal in the terminal group comprises:

the one terminal of the group operatively connected to the reflective star coupler via a predetermined one of said m fiber optic cables.

* * * * *